(12) United States Patent
Long et al.

(10) Patent No.: US 9,902,254 B1
(45) Date of Patent: Feb. 27, 2018

(54) BODY MOUNT ASSEMBLY AND A METHOD FOR MOUNTING A RADIATOR ASSEMBLY ON A VEHICLE FRAME BEFORE ATTACHING A BODY STRUCTURE TO THE FRAME

(71) Applicant: GM Global Technology Operations LLC, Detroit, MI (US)

(72) Inventors: Michael G. Long, Troy, MI (US); Kulbir S. Dhuga, LaSalle (CA); Joseph S. Willis, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/218,588

(22) Filed: Jul. 25, 2016

(51) Int. Cl.
*B60K 11/04* (2006.01)
*B62D 65/02* (2006.01)

(52) U.S. Cl.
CPC ............. *B60K 11/04* (2013.01); *B62D 65/02* (2013.01)

(58) Field of Classification Search
CPC . B60K 1/02; B60K 1/04; B62D 65/02; B62D 65/024; B62D 65/04
USPC ...................................... 180/68.1, 68.4, 68.6
See application file for complete search history.

(56) References Cited

U.S. PATENT DOCUMENTS

| | | | | |
|---|---|---|---|---|
| 5,544,714 | A * | 8/1996 | May ...................... | B60K 11/04 165/67 |
| 6,260,609 | B1 * | 7/2001 | Takahashi .............. | B60K 11/04 165/67 |
| 8,235,155 | B2 * | 8/2012 | Seegert ..................... | E02F 9/00 165/67 |
| 9,186,980 | B2 * | 11/2015 | Shibutani ............... | B60K 11/04 |

* cited by examiner

*Primary Examiner* — John Walters

(57) ABSTRACT

A method according to the principles of the present disclosure includes fastening a body mount assembly to a frame of a vehicle, where the body mount assembly includes a radiator support bracket. The method further includes mounting a radiator assembly onto the radiator support bracket after fastening the body mount assembly to the frame, and fastening a body structure to the body mount assembly.

20 Claims, 6 Drawing Sheets

BODY MOUNT ASSEMBLY AND A METHOD FOR MOUNTING A RADIATOR ASSEMBLY ON A VEHICLE FRAME BEFORE ATTACHING A BODY STRUCTURE TO THE FRAME

FIELD

The present disclosure relates to body mount assemblies and methods for mounting a radiator assembly on a vehicle frame before attaching a body structure on the frame.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a conventional vehicle assembly process, a radiator assembly is mounted on a body structure of a vehicle before the body structure is attached to a frame of the vehicle. Then, after the body structure is attached to the frame, various electrical and plumbing connections are made between the radiator assembly and a powertrain assembly (e.g., an engine and a transmission) that is also attached to the frame. However, to make these connections, an assembly worker has to reach over, under and around the body structure, which may be difficult and may limit the design of the body structure.

SUMMARY

A method according to the principles of the present disclosure includes fastening a body mount assembly to a frame of a vehicle, where the body mount assembly includes a radiator support bracket. The method further includes mounting a radiator assembly onto the radiator support bracket after fastening the body mount assembly to the frame, and fastening a body structure to the body mount assembly.

A body mount assembly according to the principles of the present disclosure includes a frame mounting bracket, a first isolator, and a radiator support bracket. The frame mounting bracket defines at least one hole configured to receive a first fastener for fastening the body mount assembly to a frame of a vehicle. The first isolator is disposed on a first side of the frame mounting bracket and is configured inhibit transmission of vibration from the frame to a body structure. The radiator support bracket is disposed on an opposite side of the first isolator relative to the frame mounting bracket and is configured to support a radiator assembly. The body mount assembly further includes a second fastener configured to extend through the frame mounting bracket, through the first isolator, through the radiator support bracket, and into the body structure to fasten the body structure to the frame.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A method of assembling a vehicle according to the present disclosure includes mounting both a powertrain assembly and a radiator assembly on a frame of the vehicle before mounting a body structure on the frame. Since the radiator assembly is mounted before the body structure, plumbing and electrical connections can be made between the radiator assembly and the powertrain assembly without having to reach over, under and around the body structure. Thus, the method improves the ease of assembling the vehicle, reduces the time and cost of assembling the vehicle, and allows various body structure designs that may not otherwise be possible.

Figure 1:
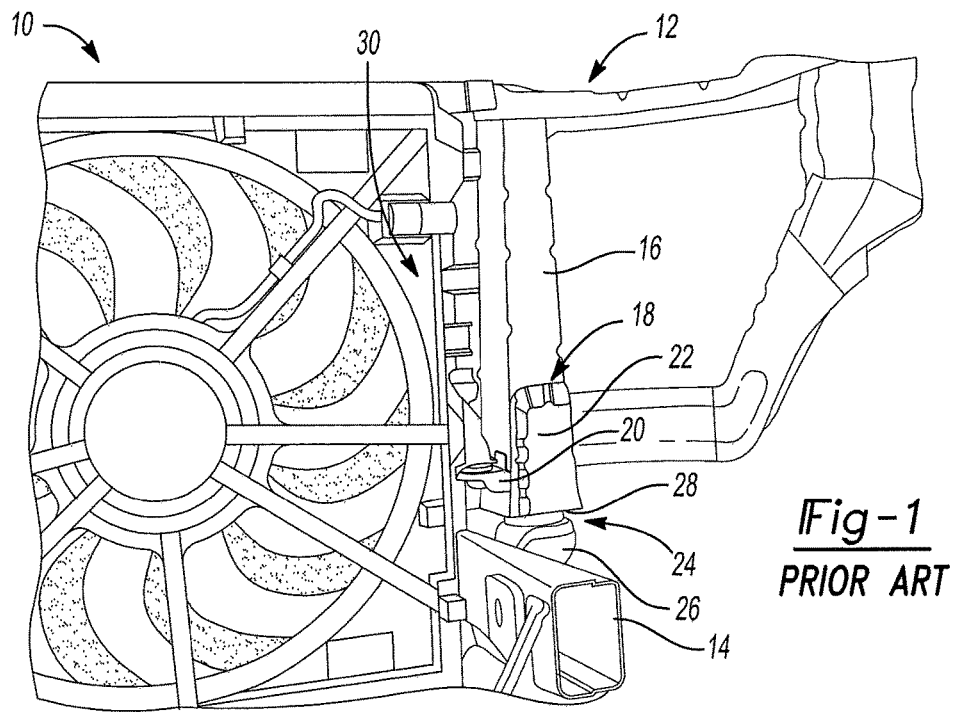
FIG. 1 is a perspective view of a radiator assembly mounted on a body structure and the body structure mounted on a frame using a body mount assembly according to the prior art.

Referring now to FIG. 1, a conventional scheme for mounting a radiator assembly 10 on a body structure 12 and for mounting the body structure 12 to a vehicle frame 14 is illustrated. The body structure 12 includes a vertical post 16 and a radiator support bracket 18 that is welded to the vertical post 16. The radiator support bracket 18 includes a radiator mount portion 20 on which the radiator assembly 10 is mounted, and a welded portion 22 that is welded to the vertical post 16.

The body structure 12 is mounted to the frame 14 using a body mount assembly 24 after the radiator assembly 10 is mounted on the body structure 12. The body mount assembly 24 is disposed between a body mount bracket 26 on the frame 14 and a lower end 28 of the vertical post 16. Thus, the radiator assembly 10 is mounted on the body structure 12 using the radiator support bracket 18, and the body structure 12 is mounted on the frame 14 independent of the mounting of the radiator assembly 10 on the body structure 12. In addition, since the radiator support bracket 18 is welded to and part of the body structure 12, the radiator assembly 10 cannot be mounted on the frame 14 before the body structure 12 is mounted on the frame 14.

Figure 2:
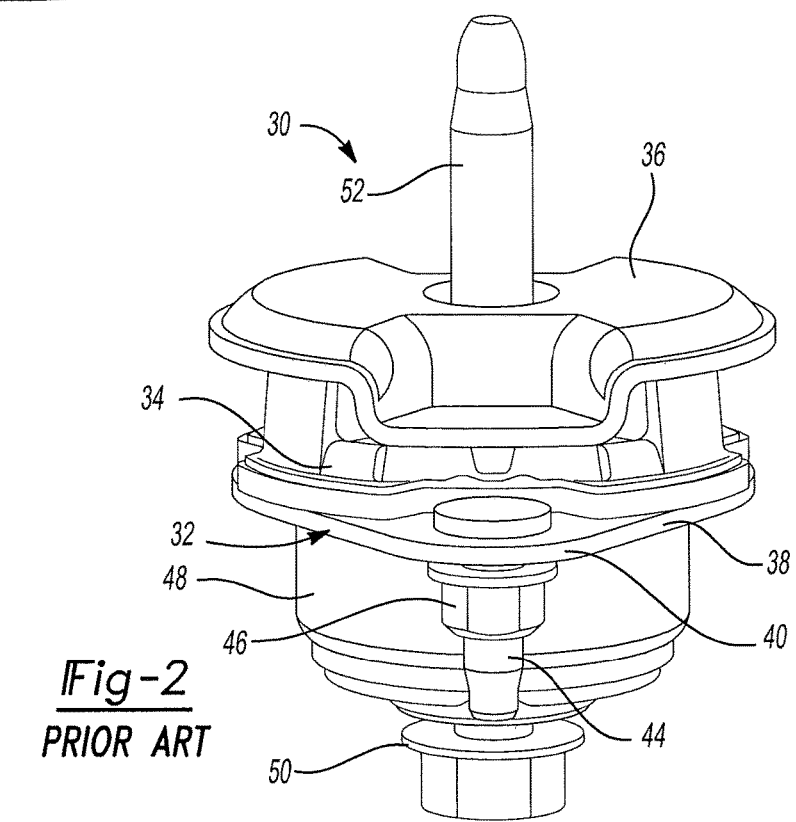
FIG. 2 is a perspective view of a body mount assembly according to the prior art.

Referring now to FIG. 2, an example of a conventional body mount assembly 30 includes a frame mounting bracket 32, a first isolator 34 disposed on a first side of the frame mounting bracket 32, and a body structure support bracket 36 disposed on an opposite side of the first isolator 34 relative to the frame mounting bracket 32. The frame mounting bracket 32 includes a planar body 38 and a pair of ears 40 extending radially outward from the planar body 38 in opposite directions. Each of the ears 40 defines a hole (not shown) configured to receive a bolt or screw 44 for fastening the body mount assembly 30 to a vehicle frame. A nut 46 can be threaded onto each of the screws 44 after the screws 44 are inserted through the ears 40 of the frame mounting bracket 32 and through a vehicle frame.

The body structure support bracket 36 is configured to support a body structure of a vehicle. The first isolator 34 is configured to inhibit transmission of vibration from a frame of a vehicle to a body structure of a vehicle. In other words, the first isolator 34 is configured to isolate the body structure from vibrations transmitted to the body structure from the frame.

The body mount assembly 30 further includes a second isolator 48 disposed on a second side of the frame mounting bracket 32 opposite of the first side, a washer 50 disposed on an opposite side of the second isolator 48 relative to the frame mounting bracket 32, and a bolt or screw 52. Like the first isolator 34, the second isolator 48 is configured to inhibit transmission of vibration from a frame of a vehicle to a body structure of a vehicle. The screw 52 can be inserted through the washer, through the second isolator 48, through the frame mounting bracket 32, through the first isolator 34, through the body structure support bracket 36, and into a body structure of a vehicle to fasten the body structure to a frame of the vehicle.

The body mount assembly 30 does not include a bracket configured to support a radiator assembly. Thus, a radiator assembly cannot be mounted to a vehicle frame using the body mount assembly 30. Therefore, if a vehicle only includes body mount assemblies such as the body mount assembly 30, a radiator assembly is typically mounted on a body structure of the vehicle using a radiator support bracket such as the radiator support bracket 18 of FIG. 1. Since such a radiator support bracket is welded to and part of the body structure, the radiator assembly cannot be mounted on a frame of the vehicle before the body structure is mounted on the frame.

Figure 3:
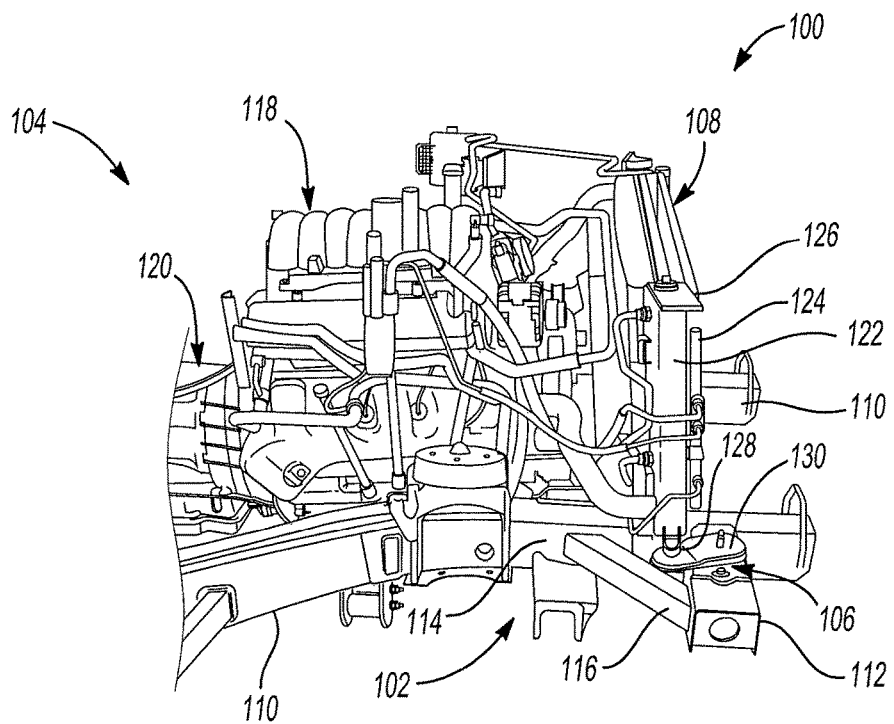
FIG. 3 is a perspective view of a powertrain assembly mounted on a frame and a radiator assembly mounted on the frame using an example body mount assembly according to the present disclosure.

Referring now to FIG. 3, a vehicle 100 according to the present disclosure includes a frame 102, a powertrain assembly 104, a body mount assembly 106, and a radiator assembly 108. The frame 102 includes a pair of longitudinal frame rails 110 disposed on opposite sides of the vehicle 100, a radiator support member 112 extending laterally from an outboard surface 114 of each of the frame rails 110, and a pair of braces 116. Each of the braces 116 extends laterally and longitudinally between one of the frame rails 110 and one of the radiator support members 112.

The powertrain assembly 104 includes an engine 118 and a transmission 120. The radiator assembly 108 includes an upper radiator 122, a condenser 124, a transmission oil cooler 126, and a pair of radiator mounts 128 disposed at opposite lateral ends of the radiator assembly 108. Each radiator mount 128 acts as a base or foot of the radiator assembly 108. The radiator mounts 128 may be made from a vibration dampening material, such as rubber, to isolate other components of the radiator assembly 108 from vibrations transmitted to the radiator assembly 108 from the frame 102. The body mount assembly 106 includes a radiator support bracket 130 configured to support the radiator assembly 108. Each radiator mount 128 rests on the radiator support bracket 130.

Figure 4:
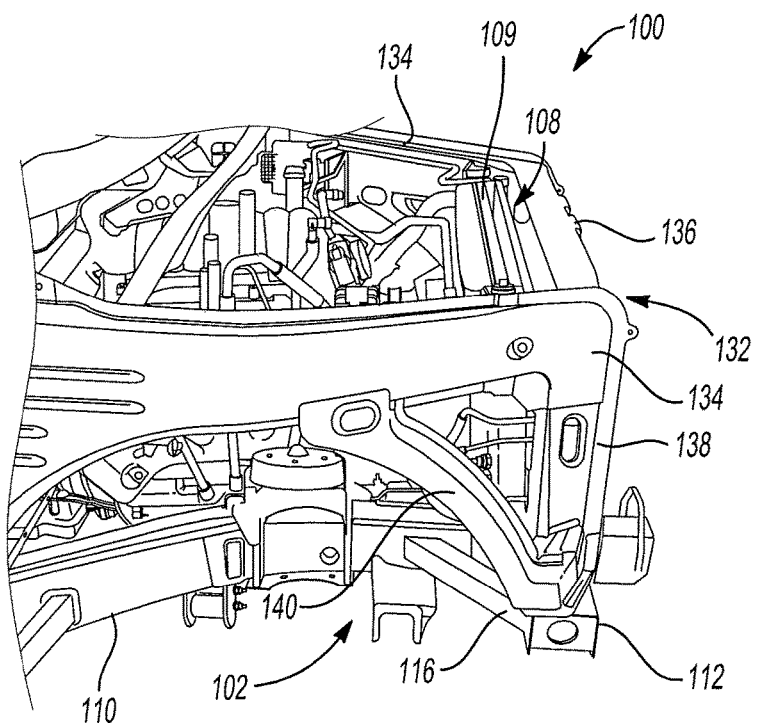
FIG. 4 is a perspective view similar to that of FIG. 3 except that FIG. 4 also shows a body structure mounted to the frame using the body mount assembly of FIG. 3.

Referring now to FIG. 4, the vehicle 100 further includes a body structure 132. The body structure 132 includes a pair of longitudinal members 134 disposed on opposite sides of the vehicle 100, a cross member 136 extending laterally between the longitudinal members 134, a vertical post 138 extending downward from each of the longitudinal members 134, and a pair of braces 140. Each of the braces 140 extends vertically and longitudinally between one of the longitudinal members 134 and one of vertical posts 138.

Referring again to FIG. 3, the vehicle 100 further includes various fluid lines 142 used to create plumbing connections between the powertrain assembly 104 and the radiator assembly 108. In addition, the vehicle 100 includes various electrical wires 144 (FIG. 8) used to create electrical connections between the powertrain assembly 104 and the radiator assembly 108. When the body structure 132 has not yet been mounted on the frame 102, as shown in FIG. 3, the fluid lines 142 and the electrical wires 144 can be easily routed to the radiator assembly 108. In contrast, after the body structure 132 is mounted on the frame 102, as shown in FIG. 4, it may be difficult to route the fluid lines 142 and the electrical wires 144 to the radiator assembly 108.

The body mount assembly 106 enables the radiator assembly 108 to be mounted on the frame 102 before the body structure 132 is mounted on the frame 102, which makes it easier to make the plumbing and electrical connections. In this manner, the body mount assembly 106 improves the ease of assembling the vehicle 100, reduces the time and cost of assembling the vehicle 100, and allows various body structure designs that may not otherwise be possible.

Figure 5:
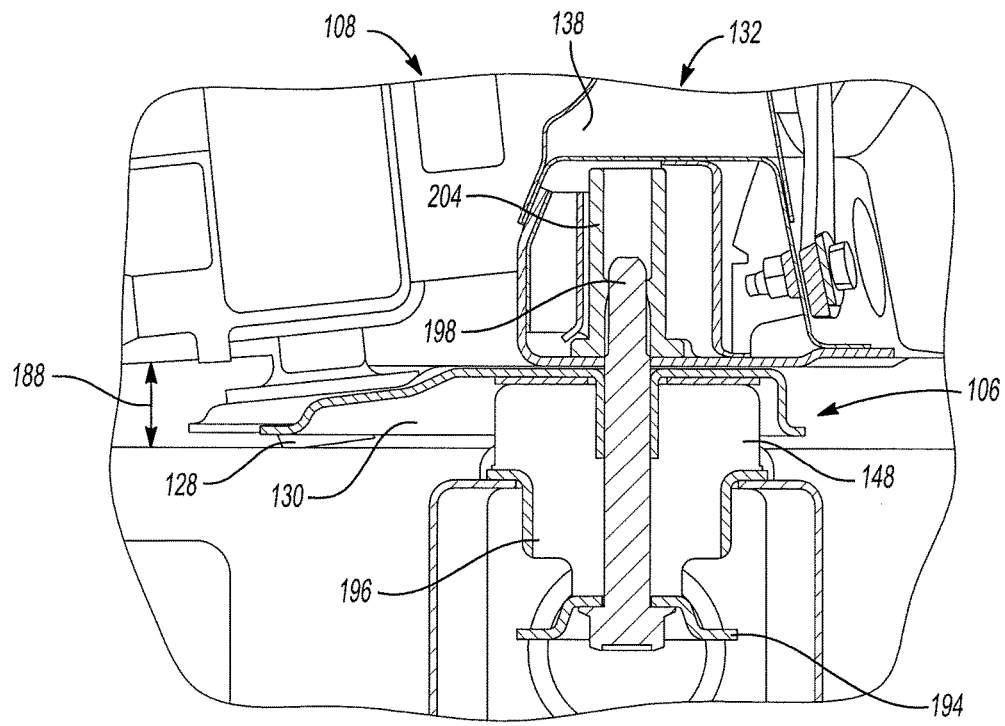
FIG. 5 is a section view of the body mount assembly of FIG. 3 mounting the radiator assembly and the body structure to the frame.
Figure 6:
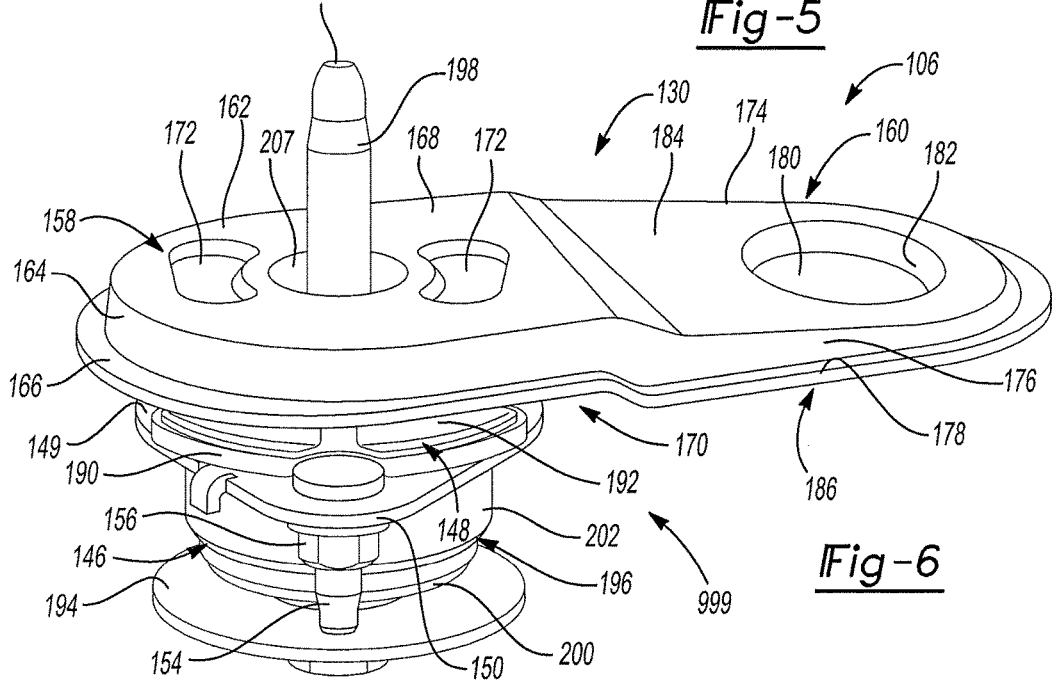
FIG. 6 is a perspective view of the body mount assembly of FIG. 3.

Referring now FIGS. 5 and 6, the body mount assembly 106 includes the radiator support bracket 130, a frame mounting bracket 146, and a first isolator 148 disposed between the radiator support bracket 130 and the frame mounting bracket 146. The frame mounting bracket 146 includes a disk-shaped body 149 and a pair of ears 150 extending radially outward from the disk-shaped body 149 in opposite directions. Each of the ears 150 defines a hole (not shown) configured to receive a bolt or screw 154 for fastening the body mount assembly 106 to the frame 102. A nut 156 can be threaded onto each of the screws 154 after the screws 154 are inserted through the ears 150 of the frame mounting bracket 32 and through the frame 102.

The radiator support bracket 130 includes a body mount portion 158 configured to support the body structure 132 and a radiator mount portion 160 configured to support the radiator assembly 108. The body mount portion 158 includes a planar body 162 configured to be disposed between the first isolator 148 and the body structure 132, a perimeter wall 164 extending downward from the planar body 162 toward the frame mounting bracket 146, and a flange 166 extending radially outward from the bottom of the perimeter wall 164. The planar body 162 has a first surface 168 configured to engage the body structure 132, and a second surface 170 opposite of the first surface 168 and configured to engage the first isolator 148.

The planar body 162 includes a pair of indentations 172, and the first isolator 148 may include a pair of indentations (not shown) having the same size and shape as the indentations 172. The indentations 172 in the planar body 162 of the body mount portion 158 may fit within and engage the corresponding indentations in the first isolator 148 to prevent the radiator support bracket 130 from rotating relative to the first isolator 148. The perimeter wall 164 may prevent debris from entering the interface between the first isolator 148 and the radiator support bracket 130.

The radiator mount portion 160 includes a planar body 174, a perimeter wall 176 extending downward from the planar body 174, and a flange 178 extending radially outward from the bottom of the perimeter wall 176. The radiator mount portion 160 defines a hole 180 extending through the planar body 174 of the radiator mount portion 160 and configured to receive the radiator mount 128 of the radiator assembly 108. The hole 180 is defined by the planar body 174 and by a hole wall 182 extending around the perimeter of the hole 180 and extending downward from the planar body 174.

The planar body 174 has a first surface 184 that engages the radiator mount 128 when the radiator mount 128 is inserted into the hole 180, and a second surface 186 opposite of the first surface 184. The first surface 184 on the planar body 174 of the radiator mount portion 160 and the first surface 168 on the planar body 162 of the body mount portion 158 are in different planes. As best shown in FIG. 6, the first surface 184 of the radiator mount portion 160 is offset in a downward direction relative to the first surface 168 of the body mount portion 158. As best shown in FIG. 5, this offset provides a gap 188 between the body structure 132 the radiator support bracket 130. The gap 188 provides a space that accommodates the portion of the body mount 128 that is not inserted into the hole 180 in the radiator support bracket 130.

The first isolator 148 is configured to inhibit transmission of vibration from the frame 102 to the body structure 132. In other words, the first isolator 148 is configured to isolate the body structure 132 from vibrations transmitted to the body structure 132 from the frame 102. The first isolator 148 includes a base portion 190 and a main body portion 192 extending from the base portion 190 in an upward direction toward the radiator support bracket 130. The base portion 190 may be made from a relatively stiff material, such as plastic, and the main body portion 192 may be made from a vibration damping material, such as rubber.

The body mount assembly 106 further includes a washer 194, a second isolator 196 disposed between the frame mounting bracket 146 and the washer 194, and a bolt or screw 198. Like the first isolator 148, the second isolator 196 is configured to inhibit transmission of vibration from the frame 102 to the body structure 132. The second isolator 196 includes a base portion 200 and a main body portion 202 extending from the base 200 in an upward direction toward the frame mounting bracket 146. The base portion 200 may be made from a relatively stiff material, such as plastic, and the main body portion 202 may be made from a vibration damping material, such as rubber.

As shown in FIG. 5, the screw 198 can be inserted through the washer 194, through the second isolator 196, through the frame mounting bracket 146, through the first isolator 148, through the radiator support bracket 130, and into the body structure 132 to fasten the body structure 132 to the frame 102. The washer 194, the second isolator 196, the frame mounting bracket 146, the first isolator 148, and the radiator support bracket 130 may each define a hole configured to receive the screw 198. For example, the radiator support bracket 130 may define a hole 207 configured to receive the screw 198. The body structure 132 may include a threaded collet or nut 204. The nut 204 may be captured within the interior of the vertical post 138 and/or fixed (e.g., welded) thereto.

Figure 7:
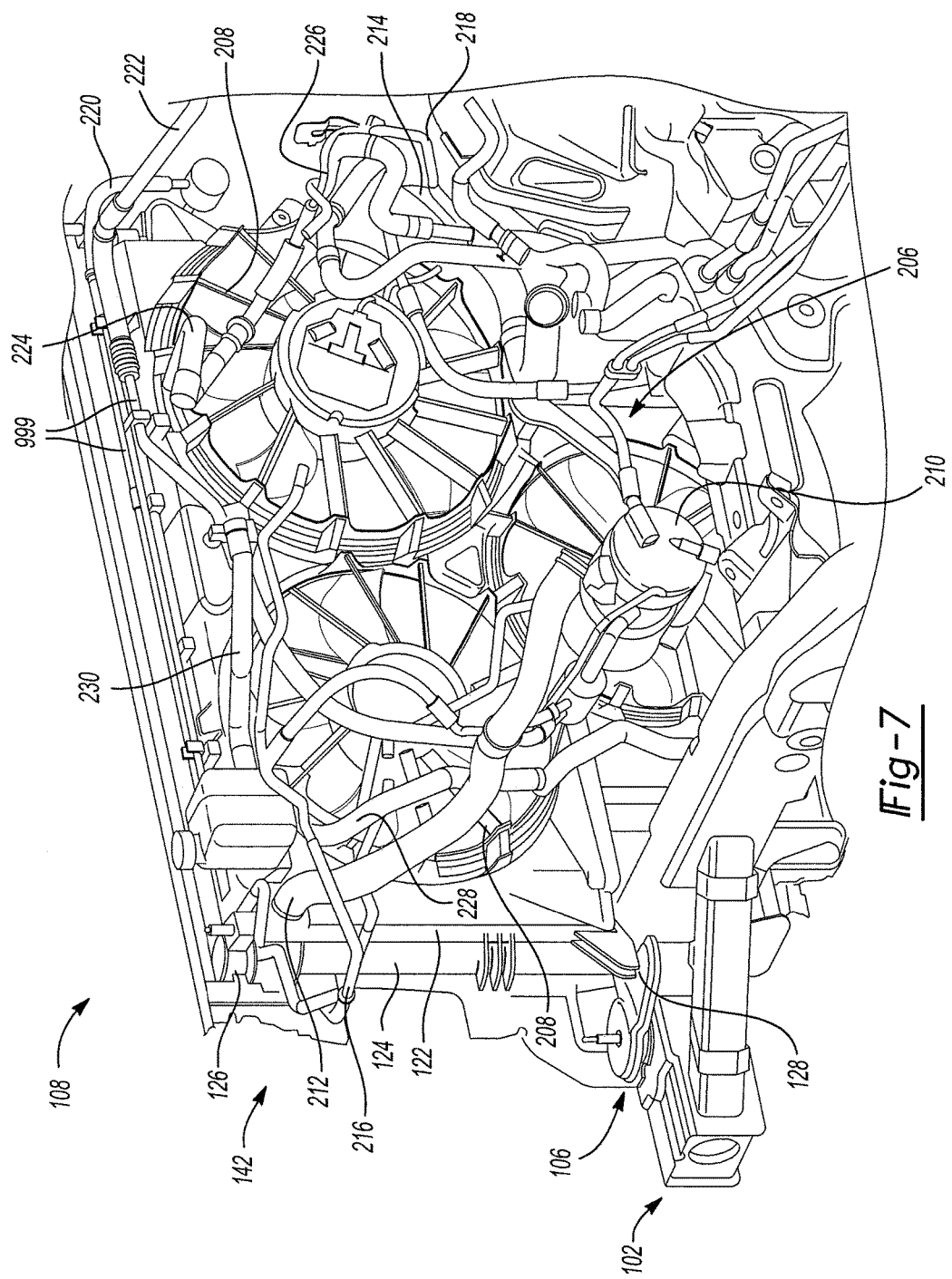
FIG. 7 is a perspective view illustrating plumbing connections between the radiator assembly of FIG. 3 and the powertrain assembly of FIG. 3.

Referring now to FIG. 7, the fluid lines 142 used to create plumbing connections between the powertrain assembly 104 and the radiator assembly 108 are illustrated. Additional details of the radiator assembly 108 are also illustrated. As noted above, the radiator assembly 108 includes the upper radiator 122, the condenser 124, the transmission oil cooler 126, and the radiator mounts 128. In addition, the radiator assembly 108 includes a lower radiator 206. The upper radiator 122 includes a pair of fans 208, and the lower radiator 206 includes a single fan 210.

The fluid lines 142 include an upper radiator hose 212, a lower radiator hose 214, a transmission cooling inlet line 216, a transmission cooling return line 218, a condenser inlet line 220, a condenser return line 222, a charge air cooler (CAC) supply line 224, and a CAC return line 226. One of the radiator hoses 212 or 214 may be an inlet hose extending from the engine 118 to the upper radiator 122, and the other one of the radiator hoses 212 or 214 may be an outlet hose extending from the upper radiator 122 to the engine 118. The transmission cooling inlet line 216 extends from the transmission oil cooler 126 to the transmission 120. The transmission cooling return line 218 extends from the transmission 120 the transmission oil cooler 126.

The condenser inlet line 220 extends from an AC compressor (not shown) to the condenser 124. The condenser return line 222 extends from the condenser 124 to the AC compressor. The CAC supply line 224 extends from the lower radiator 206 to a charge air cooler (not shown). The CAC return line 226 extends from the charge air cooler to the lower radiator 206.

The fluid lines 142 to further include a low temperature coolant loop supply 228 and a low temperature coolant loop return 230. The low temperature coolant loop supply 228 extends from the lower radiator 206 to a low temperature coolant loop (not shown). The low temperature coolant loop circulates coolant through an intercooler (not shown) on the engine 118, through a diesel emissions fluid (DEF) injector (not shown), and through a fuel cooler (not shown). The low temperature coolant loop return 230 extends from the low temperature coolant loop to the lower radiator 206.

Figure 8:
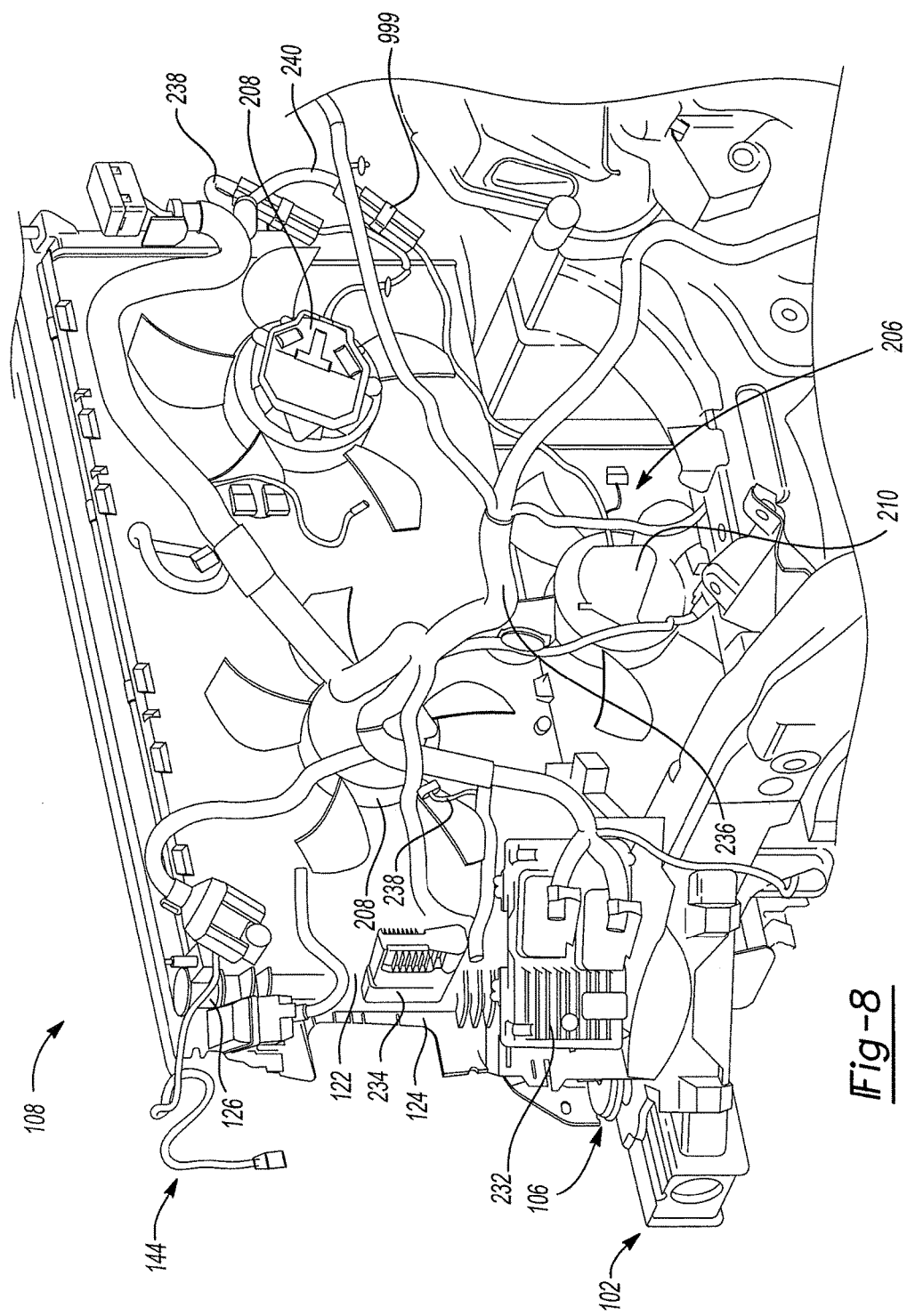
FIG. 8 is a perspective view illustrating electrical connections between the radiator assembly of FIG. 3 and the powertrain assembly of FIG. 3.

Referring now to FIG. 8, the electrical wires 144 used to create electrical connections between the powertrain assembly 104 and the radiator assembly 108 are illustrated. An engine control module (ECM) 232 and a transmission control module (TCM) 234 are also illustrated. The ECM 232 controls operation of the engine 118 and may control a valve (not shown) and/or a pump (not shown) to regulate coolant flow to and from the engine 118 and components thereof. The TCM 234 controls operation of the transmission 120 and may control a valve (not shown) and/or a pump (not shown) to regulate coolant flow to and from the transmission 120 and components thereof. The ECM 232 and/or the TCM 234 may be considered part of the powertrain assembly 104.

In addition, the ECM 232 may control operation of the upper radiator 122, the condenser 124, and/or the lower radiator 206, and the TCM 234 may control operation of the transmission oil cooler 126, and the radiator mounts 128. For example, the ECM 232 may switch the fans 208 and 210 of the upper and lower radiators 122 and 206 between an OFF state and an ON state, and/or adjust the speed of the fans 208 and 210. In another example, the valves controlled by the ECM 232 to regulate flow to and from the upper radiator 122, the condenser 124, and the lower radiator 206 may be part of the upper radiator 122, the condenser 124, and the lower radiator 206, respectively. Similarly, the valves controlled by the TCM 234 to regulate flow to and from the transmission oil cooler 126 may be part of the transmission oil cooler 126.

The ECM 232 may communicate with the upper radiator 122, the condenser 124, and/or the lower radiator 206 through a wiring harness 236. Additionally or alternatively, the TCM 234 may communicate with the transmission oil cooler 126 through the wiring harness 236. The wiring harness 236 may be fixed to the frame 102 and may be considered part of the powertrain assembly 104.

The electrical wires 144 include a pair of upper radiator fan wires 238 and a lower radiator fan wire 240. Each of the upper radiator fan wires 238 is routed to and connected with one of the fans 208 of the upper radiator 122. The lower radiator fan wire 240 is routed to and connected with the fan 210 of the lower radiator 206.

Figure 9:
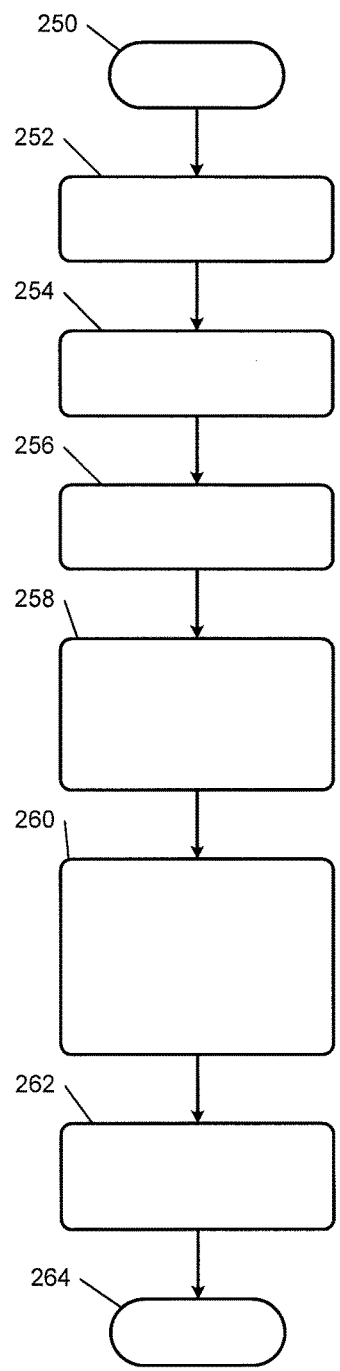
FIG. 9 is a flowchart illustrating an example method for mounting a radiator assembly on a frame before mounting a body structure on the frame according to the present disclosure.

Referring now to FIG. 9, with additional reference to FIG. 3, a method for mounting the radiator assembly 108 on the frame 102 before attaching the body structure 132 to the frame 102 begins at 302. At 252, an assembly worker (not shown) attaches (e.g., fastens) the engine 118 to the frame 102 of the vehicle 100. At 254, the worker attaches (e.g., fastens) the transmission 120 to the frame 102. In various implementations, the engine 118 and the transmission 120 may be preassembled as a single assembly, and the work may attach (e.g., fasten) the engine 118 and the transmission 120 to the frame 102 in a single step (e.g., at the same time).

At 256, the worker attaches the body mount assembly 106 to the frame 102. With brief reference to FIGS. 5 and 6, to assembly the body mount assembly 106 to the frame 102, the worker places the frame mounting bracket 146 on the frame 102. The worker then inserts the screws 154 through the holes in the ears 150 of the frame mounting bracket 146 and through the holes in the frame 102, and threads the nuts 156 onto the screws 154 to secure the frame mounting bracket 146 to the frame 102.

The worker may then slide the screw 198 through the hole in the washer 194, through the hole in the second isolator 196, through the central hole in the frame mounting bracket 146, through the hole in the first isolator 148, and into the hole in the radiator mount portion 160 of the radiator support bracket 130. The worker may then assemble a plastic keeper or nut (not shown) onto a distal end 199 of the screw 198 to hold the body mount assembly 106 together and maintain the distal end 199 flush with the first surface 168 of the radiator support bracket 130. In various implementations, the washer 194, the second isolator 196, the screw 198, and/or the plastic keeper may be preassembled (e.g., assembled when delivered to the assembly plant) to reduce the number of operations performed by the worker.

Referring again to FIGS. 3 and 9, at 258, the worker mounts the radiator assembly 108 onto the radiator support bracket 130 of the body mount assembly 106. The worker mounts the radiator assembly 108 onto the radiator support bracket 130 by inserting the radiator mount 128 into the hole 180 in the radiator support bracket 130 as shown in FIG. 5. The worker may also use a jig, a fixture, and/or a strap (not shown) to maintain the radiator assembly 108 in an upright position until the body structure 132 is mounted on the frame 102.

At 260, the worker makes various plumbing and/or electrical connections between the radiator assembly 108 and components attached to the frame 102. The worker may make the plumbing connections by routing one or more (e.g., all) of the fluid lines 142 shown in FIG. 7 from a component that is attached to the frame (directly or indirectly) to the radiator assembly 108, and connecting the fluid lines 142 to the radiator assembly 108. Thus, the plumbing connections may include a plumbing connection between the engine 118 and the upper radiator 122 and/or a plumbing connection between the transmission 120 and the transmission oil cooler 126.

The electrical connections may be made by routing one or more (e.g., all) of the electrical wires 144 shown in FIG. 8 from a component that is attached to the frame (directly or indirectly) to the radiator assembly 108, and connecting the electrical wires 144 to the radiator assembly 108. Thus, the electrical connections may include an electrical connection between (i) the fans 208 and 210 of the upper radiator 122 and (ii) the wiring harness 236. Since the body structure 132 is not yet mounted on the frame 102, the worker can make plumbing and electrical connections without having to reach over, under and around the body structure 132.

At 262, the worker attaches the body structure 132 to the body mount assembly 106. The worker does this by placing the body structure 132 onto the body mount portion 158 of the radiator support bracket 130, and driving the screw 198 into the nut 204 as shown in FIG. 5. The plastic keeper may be removed from the screw 198 before driving the screw 198 into the nut 204, or the plastic keeper may be left inside of the body mount assembly 106.

When the body structure 132 is attached to the frame 102 via the body mount assembly 106, the body structure 132 holds the radiator assembly 108 in an upright position and prevents the radiator mount 128 from backing out of the hole 180 in the radiator support bracket 130. For example, referring to FIG. 4, a bracket (not shown) may be attached to the cross member 136 of the body structure 132 and to a top surface 109 of the radiator assembly 108 to hold the radiator assembly 108 in an upright position and prevent the radiator mount 128 from backing out of the hole 180. The method of FIG. 9 ends at 264.

In contrast to the body structure support bracket 36 shown in FIG. 1, the radiator support bracket 130 is not joined (e.g., welded) to the body structure 132 before the body structure 132 is mounted on the frame 102. In addition, when the body structure 132 is mounted to the frame 102, the radiator support bracket 130 is not joined to the body structure 132 other than by the screw 198, as best shown in FIG. 5. Further, when the body structure 132 is mounted to the frame 102, at least part of the body mount portion 158 of the radiator support bracket 130 is disposed above the radiator support member 112 of the frame 102, and at least part of the radiator mount portion 160 of the radiator support bracket 130 is not disposed above the radiator support member 112.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method comprising:
   fastening a body mount assembly to a frame of a vehicle, the body mount assembly including a radiator support bracket;
   mounting a radiator assembly onto the radiator support bracket after fastening the body mount assembly to the frame; and
   fastening a body structure to the body mount assembly.

2. The method of claim 1 further comprising, before fastening the body structure to the body mount assembly, making at least one connection between a first component attached to the frame and a second component attached to the radiator assembly.

3. The method of claim 2 wherein the at least one connection includes a plumbing connection.

4. The method of claim 2 wherein the at least one connection includes an electrical connection.

5. The method of claim 2 wherein the at least one connection includes multiple electrical connections and multiple plumbing connections.

6. The method of claim 1 further comprising fastening the body mount assembly to the frame by inserting a pair of fasteners through ears on a frame mounting bracket of the body mount assembly and through the frame.

7. The method of claim 1 further comprising mounting the radiator assembly to the radiator support bracket by inserting a radiator mount of the radiator assembly into a radiator mount hole in the radiator support bracket.

8. The method of claim 1 further comprising fastening the body structure to the body mount assembly by inserting a fastener through the body mount assembly and into the body structure.

9. The method of claim 1 further comprising:
fastening an engine to the frame before mounting the radiator assembly onto the radiator support bracket; and
making a plumbing connection between the engine and a radiator of the radiator assembly before fastening the body structure to the body mount assembly.

10. The method of claim 1 further comprising:
fastening a transmission to the frame before mounting the radiator assembly onto the radiator support bracket; and
making a plumbing connection between the transmission and a transmission oil cooler of the radiator assembly before fastening the body structure to the body mount assembly.

11. A body mount assembly comprising:
a frame mounting bracket defining at least one hole configured to receive a first fastener for fastening the body mount assembly to a frame of a vehicle;
a first isolator disposed on a first side of the frame mounting bracket and configured inhibit transmission of vibration from the frame to a body structure;
a radiator support bracket disposed on an opposite side of the first isolator relative to the frame mounting bracket and configured to support a radiator assembly; and
a second fastener configured to extend through the frame mounting bracket, through the first isolator, through the radiator support bracket, and into the body structure to fasten the body structure to the frame.

12. The body mount assembly of claim 11 wherein the radiator support bracket defines a hole configured to receive the second fastener.

13. The body mount assembly of claim 11 wherein, when the body mount assembly is fastening the body structure to the frame, the radiator support bracket is not joined to the body structure other than by the second fastener.

14. The body mount assembly of claim 11 wherein the radiator support bracket includes a body mount portion configured to support the body structure and a radiator mount portion configured to support the radiator assembly.

15. The body mount assembly of claim 14 wherein, when the body mount assembly is fastening the body structure to the frame, at least part of the body mount portion is disposed above a portion of the frame, and at least part of the radiator mount portion is not disposed above that portion of the frame.

16. The body mount assembly of claim 14 wherein the body mount portion includes a planar body configured to be disposed between the first isolator and the body structure, and a perimeter wall extending from the planar body toward the frame mounting bracket.

17. The body mount assembly of claim 14 wherein the body mount portion has a first surface configured to engage the body structure and the radiator mount portion has a second surface configured to engage the radiator assembly, wherein the first and second surfaces are in different planes.

18. The body mount assembly of claim 14 wherein the radiator mount portion of the radiator support bracket defines a hole configured to receive a radiator mount of the radiator assembly.

19. The body mount assembly of claim 11 further comprising the first fastener, wherein the frame mounting bracket includes a disk-shaped body and a pair of ears extending radially outward from the disk-shaped body, each of the ears defining a hole configured to receive the first fastener.

20. The body mount assembly of claim 11 further comprising:
a second isolator disposed on a second side of the frame mounting bracket opposite of the first side and configured inhibit the transmission of vibration from the frame to the body structure; and
a washer disposed on an opposite side of the second isolator relative to the frame mounting bracket, wherein the second fastener is configured to extend through the washer, the second isolator, through the frame mounting bracket, through the first isolator, through the radiator support bracket, and into the body structure to fasten the body structure to the frame.

* * * * *